United States Patent
Kasdan

Patent Number: 5,343,538
Date of Patent: Aug. 30, 1994

[54] METHOD AND AN APPARATUS FOR IDENTIFYING AN OBJECT USING QUANTILE PARTITIONS

[75] Inventor: Harvey L. Kasdan, Van Nuys, Calif.

[73] Assignee: International Remote Imaging Systems, Inc., Chatsworth, Calif.

[21] Appl. No.: 956,056

[22] Filed: Oct. 2, 1992

[51] Int. Cl.$^5$ ............................................. G06K 9/46
[52] U.S. Cl. ........................................ 382/18; 382/6; 382/17; 382/22
[58] Field of Search ............... 382/21, 22, 6, 54, 25, 382/18, 17, 51

[56] References Cited

U.S. PATENT DOCUMENTS

| | | | |
|---|---|---|---|
| 3,705,383 | 12/1972 | Frayer | 382/6 |
| 3,851,156 | 11/1974 | Green | 364/413.08 |
| 4,075,604 | 2/1978 | Degasperi | 382/17 |
| 4,175,860 | 11/1979 | Bacus | 356/39 |
| 4,538,299 | 8/1985 | DeForest | 382/21 |
| 4,573,197 | 2/1986 | Crimmins | 382/22 |
| 4,782,389 | 11/1988 | Mayweather, III | 382/54 |
| 5,121,338 | 6/1992 | Lodder | 364/498 |

FOREIGN PATENT DOCUMENTS 9014639  11/1990  PCT Int'l Appl. .................. 382/22

*Primary Examiner*—Leo H. Boudreau
*Assistant Examiner*—Larry J. Prikockis
*Attorney, Agent, or Firm*—Limbach & Limbach

[57] ABSTRACT

The present invention relates to a method and an apparatus for identifying an object under examination. The object has a discernible boundary. An image of the object is first formed. The image is segmented to form a plurality of pixels. The boundary of the object under examination in the image is then detected. The parameters of the pixels measured within the boundary detected are formed in an ordered sequence:

$$P_1 \ldots P_k \ldots P_N$$

where $P_1$ is the first value of the parameter of the pixel within the boundary detected;

where $P_N$ is the last value of the parameter of the pixel within the boundary detected;

N is the total number of pixels within the boundary detected; and k is the index to the N pixels. The $P_k$ data point is determined such that k, the index satisfies the following relationship:

$$\frac{i-1}{M} < \frac{k}{N} < \frac{i}{M}$$

M—total number of quantile partitions
i—$i^{th}$ fraction of partition or $i^{th}$ quantile partition. The object under examination is identified based upon the $P_k$ data point value, which is the ith quantile in M partitions developed from the above relationship associated with the object.

48 Claims, 3 Drawing Sheets

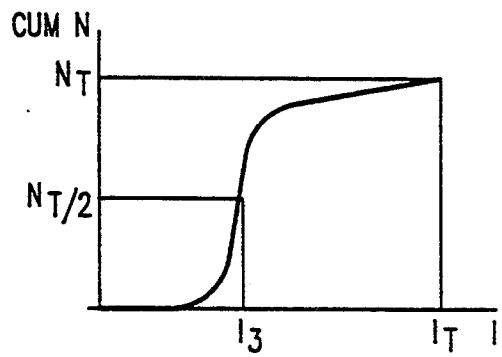
FIG. 3a
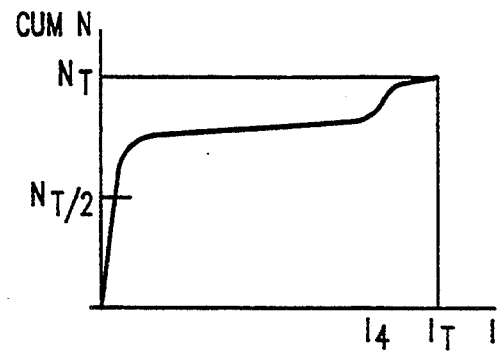
FIG. 3b
| 50th QUANTILE | INTENSITY | OBJECT |
|---|---|---|
| | $I_a$ | xxx |
| | ⋮ | ⋮ |
| | $I_3$ | 12 |
| | ⋮ | ⋮ |
| | $I_4$ | 14 |
| | ⋮ | ⋮ |
| | $I_x$ | xxx |
FIG. 4
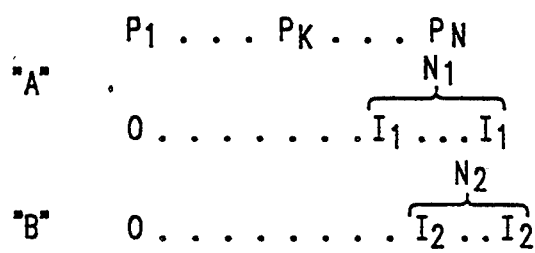
FIG. 5

METHOD AND AN APPARATUS FOR IDENTIFYING AN OBJECT USING QUANTILE PARTITIONS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Technical Field

The present invention relates to a method and an apparatus for identifying an object under examination, wherein an image of the object is formed. More particularly, the present invention relates to a method and an apparatus for identifying an object based upon the object having a discernable boundary and a novel feature termed "quantile".

2. Background Of The Invention

Methods and apparatuses for identifying an object are well-known in the art. The art of identifying biological samples is replete with various techniques for identifying the type of biological samples under examination. See, for example, U.S. Pat. No. 4,175,860. Formation of histograms of various parameters are also known. See for example U.S. Pat. No. 3,851,156.

Heretofore, one of the known methods for identifying an object is to use the size of the object. Other parameters of the object which can be used to identify an object include color, internal optical density, and average intensity within the boundary of the object.

In some cases, however, it is not possible to identify an object uniquely or to differentiate two objects if certain of their parameters yield the same result. Thus, for example, if two objects have the same size and have the same internal optical density and have the same average visible light intensity, then it is not possible to identify one of the objects or to differentiate these two objects, based upon these parameters. In addition, some of these parameters are computationally intensive requiring considerable amount of time or computer resources. Thus, the present invention contemplates a novel method and apparatus for identifying an object or to differentiate two objects based upon a new parameter which is termed "quantile".

SUMMARY OF THE INVENTION

In the present invention, a method of identifying an object, under examination, which has a discernible boundary is disclosed. The method comprises the steps of forming an image of the object. The image is segmented to form a plurality of pixels. The boundary of the object under examination in the image is then detected. A measurement is made of a parameter of each pixel within the boundary detected. The parameter values of the pixels measured within the boundary detected are formed in an ordered sequence. The particular measured parameter value $P_k$, where k is an index of the ordered sequence, is determined such that the index k satisfies the following relationship:

$$\frac{i-1}{M} < \frac{k}{N} \leq \frac{i}{M}$$

N—is the total number of pixels;
M—is the total number of quantile partitions
i—index corresponding to the $i^{th}$ fraction of partition or $i^{th}$ quantile The object under examination is then identified based upon the Pk parameter value which is the $i^{th}$ quantile within M partitions developed from the above relationship associated with the object.

The present invention also contemplates an apparatus to carry out the foregoing method.

BRIEF DESCRIPTION OF THE DRAWINGS

FIGS. 3a and 3b (FIG. 3) are a graph showing a cumulative histogram of intensity of light versus the cumulative number of pixels in the boundary detected, and with the quantile feature determined for each object.

FIG. 4 is a table of pre-determined relationships or quantiles of various known objects.

FIG. 5 is an ordered sequence of the values of the parameter measured for the pixels in the boundary.

DETAILED DESCRIPTION OF THE DRAWINGS

Figure 1:
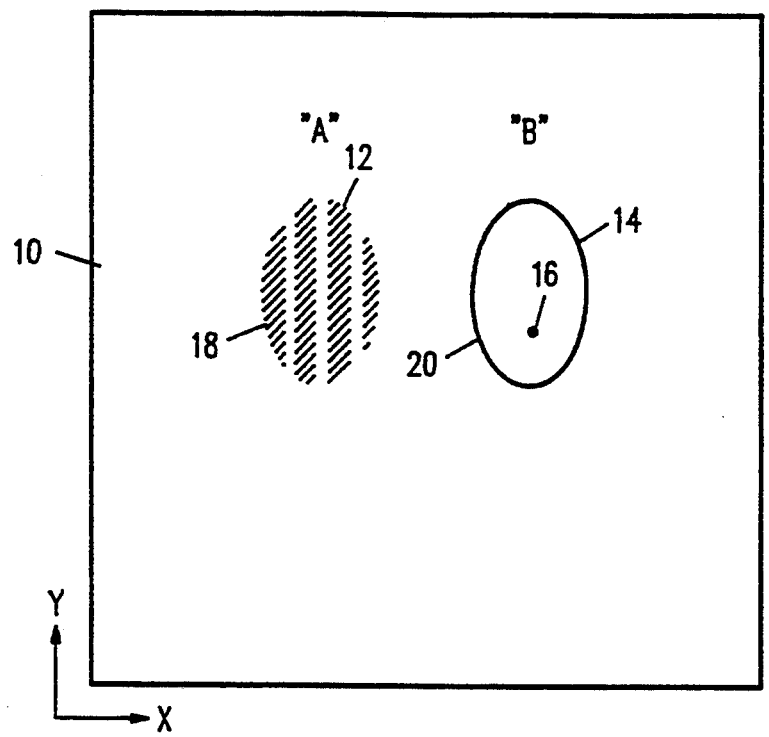
FIG. 1 is a schematic graphical illustration of two objects "a" and "b" which have the same size and shape and the same average intensity but which are different.

Referring to FIG. 1, there is shown a schematic diagram of an image 10 of two objects: object "A" 12 and "B" 14. Although the description set forth hereinafter is with reference to the method of the present invention to distinguish object "A" from object "B", it can be seen that the method of the present invention is equally applicable to identifying a single object which is under examination.

Each of the objects 12 and 14 has a discernible boundary 18 and 20, respectively. As shown in FIG. 1, each of the objects 12 and 14 has the same size and shape. Although for illustration purposes, objects 12 and 14 are shown as having the same size and shape, it is not necessary to the practice of the present invention. The purpose of illustrating the method of the present invention using objects 12 and 14 having the same size and shape is to show how the method of the present invention can be used to distinguish objects 12 and 14 under examination when other parameters, such as size and shape, cannot be used.

Objects 12 and 14, of course, represent images of real objects, such as cells, genes or other biological or non-biological objects. In the method of the present invention, an image 10 is taken of the objects 12 and 14. The image 10 can be formed by using an electronic video camera, such as a CCD (the specific details of an apparatus suitable to carry out the method of the present invention will be discussed hereinafter). The image 10 is then filtered in accordance with the different color filters that can be used to distinguish the type of color of the object. Each of the different color images is segmented, to form a plurality of pixels. Each pixel is then digitized. The boundary of each of the objects 12 and 14 is determined. This can be done, for example, by the method disclosed in U.S. Pat. No. 4,538,299, which is incorporated herein by reference.

Once the boundary of each of the objects 12 and 14 is determined, one of the parameters of each pixel inside the boundary is measured. One parameter can be the intensity of visible light. Thus, the intensity of visible light at each pixel, positioned inside the boundary positions 18 and 20, is measured.

Figure 2A:
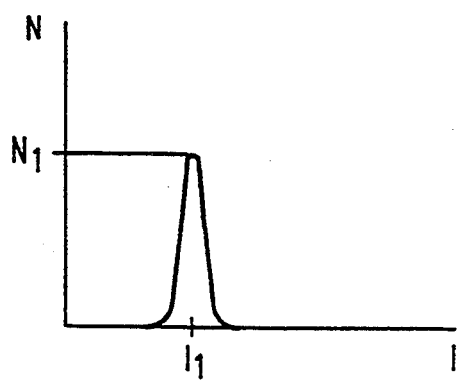
FIGS. 2a and 2b (FIG. 2) are a graph showing a histogram of intensity of light versus the number of pixels in the boundary detected.

One prior art method is to form a histogram of intensity versus the number of pixels. Referring to FIG. 2, there are shown two histograms. The histogram of FIG. 2a corresponds to the object 12 whereas the histogram of FIG. 2b corresponds to the object 14. As can be seen from FIG. 1, object 12 has a substantially uniform intensity (the dark image indicates brightness) throughout the entire region within the boundary 18. Thus, the histogram, as shown in FIG. 2a, shows substantially $N_1$ pixels each having an intensity of $I_1$. In contrast, object 14 has a small area 16 that has greater intensity than the uniform intensity $I_1$ of object 12. The histogram, as shown in FIG. 2b, shows that Nz number of pixels in the spot 16 have substantially an intensity value of $I_2$, with $N_1 > N_2$ and $I_2 > I$.

Once the histogram of each object 12 and 14 has been formed, a cumulative histogram is then developed. The cumulative histogram is formed by summing the number of pixels that has at least a certain intensity value. If $N = f(I)$, where N is the number of pixels having an intensity level I, then Cum $N = F(I)$ where Cum N is the cumulative number of pixels having an intensity level $\leq I$, and where $$F(I) = \sum_{j=0}^{I} f(j)$$

Figure 2B:
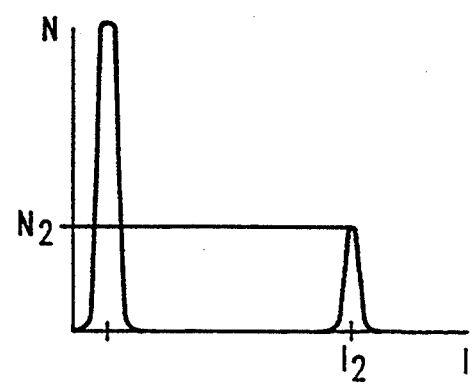

The cumulative histograms of the histograms shown in FIG. 2a and 2b, are shown in FIG. 3.

The particular parameter value, such as intensity of visible light, associated with a cumulative fraction of all pixels, is termed a quantile. Thus, from FIG. 3, the 50th quantile is $I_3$ for object 12 and $I_4$ for object 14. It should be noted that unlike conventional percentile representations, which are even increments of discrete percents, quantile representations are not limited to discrete, even increments. Thus, an object may be identified by its ith, jth, or kth quantile, where i, j, and k do not necessarily occur in discrete, even increments.

Since the quantile relationship, shown in FIG. 3, associated with each objects 12 and 14 is different, the objects 12 and 14 can be distinguished from one another, based upon this developed quantile relationship. Alternatively, to uniquely identify a particular object, such as object 14, the quantile relationship associated with the object 14 can be compared to a table of pre-determined relationships of other known objects whose quantile relationships have been pre-determined. The table of pre-determined quantile relationships of other known objects can be based upon experimental results. The comparison of the quantile relationship to the table of predetermined quantile relationships would then serve to identify uniquely the type of the object that is under examination.

For the purpose of distinguishing the objects 12 and 14 from one another or to identify an unknown object by comparing the quantile relationship, it is not necessary to compare each ordered pair of numbers (Q,I) (where Q is the quantile number and I is intensity associated therewith), to each other (in the case of two particles) or to a table (in the case of attempting to uniquely identify an object). One method is to compare the associated intensity value of the object under examination at a particular quantile number to the associated intensity value of another object at the same quantile number, or to a table of associated intensity values of identified objects at the same quantile number. Thus, as shown in FIG. 3, the 50th quantile for the object 12 has an intensity value of $I_3$ and the same 50th quantile for the object 14 has the value $I_4$. These intensity values can be compared to each other to distinguish one object from another. Alternatively, the 50th quantile of one of the objects can be compared to a table of intensity values of identified particles whose 50th quantile have been pre-determined. See FIG. 4. By comparing the 50th quantile of the unknown object to the table, the unknown object can be identified.

Of course, if we are dealing with objects of biological particles having statistical variations in intensity, it may not be possible to determine precisely the intensity associated with a particular quantile for the same particle under all cases of examination. Thus, a table relationship may encompass a range of values of intensity for a particular quantile such that the object having that range of intensity values, can be uniquely identified. The range of values can be developed from representative samples identified from experimental results.

The foregoing example illustrates a method of distinguishing objects wherein the average intensity of the two objects 12 and 14 are indistinguishable. However, using the intensity of visible light and the quantiles developed therefor, the objects can be distinguished from one another. Parameters, other than intensity of light can also be used to distinguish the particles. Thus, another parameter suitable for use is differentiating by color representation. Color can be represented by three primary colors of red, blue, and green. Alternatively, color can also be represented by hue, intensity, and saturation; or by cyan, magenta and yellow.

In one particular embodiment, the difference in color representation of the primary colors is used. The parameter of log(a)−log(b) may be employed, where a, and b are intensities of red and blue primary colors, respectively. Other possible combinations include: a being green and b being red; or a being green and b being blue.

The problem with the foregoing method of calculating quantiles is that a cumulative histogram must be formed. This necessitates the creation of a plurality of discrete "bins". A bin is defined by a cumulative fraction of all the pixels from a first fraction to a second fraction. As can be seen from FIG. 3, the entire value of the cumulative histogram from 0 to IT must be divided into a number of discrete bins. The $i^{th}$ quantile is the value of I corresponding to the $i^{th}$ cumulative fraction of the pixels. For parameters, such as log(a)−log(b), as mentioned hereinabove, the range of values can be enormous (due to the nature of the logarithmic operation). Thus, the choice of the boundary of the bins may become difficult.

In the method of the present invention, quantiles can be calculated without calculating a cumulative histogram. In the method of the present invention, the values of the parameters measured for each of the pixels within the boundary detected are placed in an ordered sequence. This is shown in FIG. 5. As previously discussed, for the example used in the method of the present invention, the objects 12 and 14 are assumed to be the same size and shape. Thus, each of those objects 12 and 14 would be segmented into the same number of total pixels, N. The parameter, for example of intensity of visible light, for each of the pixels within the boundary is then placed in an ordered sequence. $P_1$ is the value of the pixel having the lowest intensity of visible light. $P_N$ is the value of the pixel having the largest value of the parameter, such as intensity visible light. The values of the parameter of the pixels measured are then formed in an ordered sequence. A value of $P_k$ represents the parameter of the pixel between the smallest value and the largest value with k being the index to the N pixels.

Thereafter, k is chosen such that k satisfies the following relationship:

$$\frac{i-1}{M} < \frac{k}{N} \leq \frac{i}{M}$$

where M is the total number of quantile partitions and i is the $i^{th}$ fraction of partition or $i^{th}$ quantile. For the $i^{th}$ chosen quantile, once k is determined, the intensity value of the data point $P_k$ would be the intensity value associated with the $i^{th}$ quantile, or simply the value of the ith quantile. Thereafter, the object under examination can be distinguished from other objects based upon the $i^{th}$ quantile.

Alternatively, the object under examination can be distinguished from all other objects based upon a table of predetermined values of corresponding $i^{th}$ quantile. This can be accomplished even where the two objects do not have the same number of pixels. Thus, for example, object 1 has N pixels and Object 2 has $N_2$ pixels. The parameters of the pixels are placed in an ordered sequence as follows:

$P_1 \ldots P_{k1} \ldots P_{N1}$—object 1 having $N_1$ pixels $P_1 \ldots P_{k2} \ldots P_{N2}$—object 2 having $N_2$ pixels where k is the index. For each object, the $P_k$ data point is determined such that k satisfies the following:

$$\frac{i-1}{M} < \frac{k}{\text{Total No. of pixels for the object}} \leq \frac{i}{M}$$

M - total number of quantile partitions;
i - $i^{th}$ fraction of partition or $i^{th}$ quantile partition where for Objects 1 and 2 i and M are chosen to be the same. The resultant value of $P_k$ for each object is compared to one another to differentiate the objects. Of course, as previously discussed, Objects 1 and 2 can be the same type of object even if $P_{k1}$ does not equal $P_{k2}$. There can be a range of values for a particular quantile such that objects having values within that range will still be the same type.

As can be seen from the foregoing, with the method of the present invention, no cumulative histogram calculation is made. As a result, there is no need to set the size of the bin to calculate the cumulative histogram. A simple comparative relationship to determine the index of the data points is determined from which the value of the data point of the parameter measured is then obtained which corresponds to the quantile of interest.

An example of the method of the present invention can be seen with reference to the following Table 1, with an example of three particles: Particle 1, Particle 2, and Particle 3, each having 50 pixels of varying intensity of the same parameter.

TABLE 1

| Pixel # | Particle 1 | Particle 2 | Particle 3 |
| --- | --- | --- | --- |
| 1 | 6.55 | 3.77 | 2.64 |

TABLE 1-continued

| Pixel # | Particle 1 | Particle 2 | Particle 3 |
| --- | --- | --- | --- |
| 2 | 6.98 | 5.56 | 2.60 |
| 3 | 12.24 | 6.45 | 1.92 |
| 4 | 9.38 | 4.39 | 1.82 |
| 5 | 8.28 | 5.28 | 2.25 |
| 6 | 12.66 | 6.50 | 2.46 |
| 7 | 8.04 | 3.14 | 2.23 |
| 8 | 6.46 | 5.78 | 2.83 |
| 9 | 10.12 | 4.18 | 2.15 |
| 10 | 7.90 | 7.58 | 2.83 |
| 11 | 8.94 | 5.45 | 1.98 |
| 12 | 9.99 | 4.47 | 2.07 |
| 13 | 8.78 | 5.21 | 2.30 |
| 14 | 9.16 | 4.55 | 1.86 |
| 15 | 15.12 | 5.21 | 2.26 |
| 16 | 13.26 | 3.47 | 1.90 |
| 17 | 9.04 | 4.25 | 8.44 |
| 18 | 14.82 | 4.65 | 6.72 |
| 19 | 11.36 | 4.25 | 4.98 |
| 20 | 8.64 | 5.96 | 5.61 |
| 21 | 30.53 | 6.16 | 6.36 |
| 22 | 33.61 | 4.61 | 4.70 |
| 23 | 30.36 | 3.42 | 9.32 |
| 24 | 30.21 | 4.38 | 9.30 |
| 25 | 31.12 | 2.87 | 5.86 |
| 26 | 27.71 | 6.49 | 6.96 |
| 27 | 32.21 | 4.38 | 2.96 |
| 28 | 33.27 | 5.74 | 4.74 |
| 29 | 34.31 | 6.84 | 8.42 |
| 30 | 41.23 | 3.43 | 6.32 |
| 31 | 26.76 | 6.03 | 6.72 |
| 32 | 27.83 | 4.92 | 8.90 |
| 33 | 30.93 | 5.23 | 6.64 |
| 34 | 29.12 | 6.59 | 4.02 |
| 35 | 26.33 | 4.19 | 5.53 |
| 36 | 30.59 | 4.87 | 8.84 |
| 37 | 33.00 | 4.01 | 6.19 |
| 38 | 29.07 | 6.34 | 8.75 |
| 39 | 26.01 | 3.96 | 4.17 |
| 40 | 36.96 | 6.95 | 6.91 |
| 41 | 34.02 | 91.44 | 91.44 |
| 42 | 30.15 | 90.50 | 90.50 |
| 43 | 30.13 | 95.96 | 95.96 |
| 44 | 21.58 | 92.91 | 92.91 |
| 45 | 34.80 | 88.72 | 88.72 |
| 46 | 21.75 | 97.00 | 97.00 |
| 47 | 27.42 | 94.56 | 94.56 |
| 48 | 30.47 | 94.97 | 94.97 |
| 49 | 28.36 | 94.35 | 94.35 |
| 50 | 29.58 | 93.19 | 93.19 |

The next table, Table 2, shows various statistical values computed for the three particles.

TABLE 2

|  | Particle 1 | Particle 2 | Particle 3 |
| --- | --- | --- | --- |
| Mean | 22.182 | 22.682 | 22.518 |
| Standard Error | 1.504 | 5.053 | 5.073 |
| Median | 27.088 | 5.314 | 6.025 |
| Mode | # N/A | # N/A | # N/A |
| Standard Deviation | 10.637 | 35.729 | 35.872 |
| Variance | 113.141 | 1276.597 | 1286.779 |
| Kurtosis | −1.580 | 0.421 | 0.402 |
| Skewness | −0.219 | 1.547 | 1.535 |
| Range | 34.763 | 94.129 | 95.341 |
| Minimum | 6.464 | 2.872 | 1.660 |
| Maximum | 41.227 | 97.001 | 97.001 |
| Sum | 1109.125 | 1134.118 | 1125.918 |
| Count | 50 | 50 | 50 |

The next table, Table 3, shows the creation of a plurality (10) of "bins" with each bin containing a count of the number of pixels having a value between a first count to a second count. Thus, Bin #1 contains all the pixels having intensity values between 0 and 10. For particle #1, there would be 13 such pixels. For particles #2 and #3, there would be 40 and 40 respectively. The 10 bins are chosen to partition the maximum range of pixel intensity values into 10 fractions. Since the maximum range of intensity value is zero to 41.23, 97.00, and 97.00 for particles #1, #2 and #3 respectively, the 10 bins are chosen to delineate pixel intensity values of 0-10-20- . . . -90-100. The column entitled Cumulative Histogram is a cumulative count (shown as a %) of the total number of pixels having an intensity value between zero and the value associated with the Bin #. As can be seen from Table 3, particles #2 and #3 are indistinguishable based upon cumulative histogram. Further, as previously discussed, for intensity values based upon log( ), the value can be large. Thus, the range of pixel intensity values will be large, rendering difficult the division of the intensity values into a manageable number of bins.

TABLE 3

| Bin # | Intensity Value of Pixels | Particle 1 Histogram | Particle 1 Cum. Hist. | Particle 2 Histogram | Particle 2 Cum. Hist. | Particle 3 Histogram | Particle 3 Cum. Hist. |
|---|---|---|---|---|---|---|---|
| 1 | 0–10 | 13 | 26.00% | 40 | 80.00% | 40 | 80.00% |
| 2 | 10–20 | 7 | 40.00% | 0 | 80.00% | 0 | 80.00% |
| 3 | 20–30 | 12 | 64.00% | 0 | 80.00% | 0 | 80.00% |
| 4 | 30–40 | 17 | 98.00% | 0 | 80.00% | 0 | 80.00% |
| 5 | 40–50 | 1 | 100.00% | 0 | 80.00% | 0 | 80.00% |
| 6 | 50–60 | 0 | 100.00% | 0 | 80.00% | 0 | 80.00% |
| 7 | 60–70 | 0 | 100.00% | 0 | 80.00% | 0 | 80.00% |
| 8 | 70–80 | 0 | 100.00% | 0 | 80.00% | 0 | 80.00% |
| 9 | 80–90 | 0 | 100.00% | 1 | 82.00% | 1 | 82.00% |
| 10 | 90–100 | 0 | 100.00% | 9 | 100.00% | 9 | 100.00% |

The following table, Table 4, shows the table of pixel intensity values (Table 1) rearranged in accordance with the method of the present invention. The pixel intensity values are ordered in a sequential order, from highest to lowest. (Of course, the ordered sequence can be from the lowest to the highest.) In this example, $P_{50}$ for each of the three particles have the values 6.46, 2.87 and 1.66, respectively, while $P_1$ is 41.23, 97.00 and 97.00 respectively.

TABLE 4

| Rank | Percent | Particle 1 Pixel # | Particle 1 Int. | Particle 2 Pixel # | Particle 2 Int. | Particle 3 Pixel # | Particle 3 Int. |
|---|---|---|---|---|---|---|---|
| 1 | 100.00% | 30 | 41.23 | 46 | 97.00 | 46 | 97.00 |
| 2 | 97.95% | 40 | 36.96 | 43 | 95.96 | 43 | 95.96 |
| 3 | 95.91% | 45 | 34.80 | 48 | 94.97 | 48 | 94.97 |
| 4 | 93.87% | 29 | 34.31 | 47 | 94.56 | 47 | 94.56 |
| 5 | 91.83% | 41 | 34.02 | 49 | 94.35 | 49 | 94.35 |
| 6 | 89.79% | 22 | 33.51 | 50 | 93.19 | 50 | 93.19 |
| 7 | 87.75% | 28 | 33.27 | 44 | 92.91 | 44 | 92.91 |
| 8 | 85.71% | 37 | 33.00 | 41 | 91.44 | 41 | 91.44 |
| 9 | 83.67% | 27 | 32.31 | 42 | 90.50 | 42 | 90.50 |
| 10 | 81.63% | 25 | 31.12 | 45 | 88.72 | 45 | 88.72 |
| 11 | 79.59% | 33 | 30.93 | 10 | 7.58 | 23 | 9.32 |
| 12 | 77.55% | 36 | 30.59 | 40 | 6.95 | 24 | 9.30 |
| 13 | 75.51% | 21 | 30.53 | 29 | 6.84 | 32 | 8.90 |
| 14 | 73.46% | 48 | 30.47 | 34 | 6.59 | 36 | 8.84 |
| 15 | 71.42% | 23 | 30.36 | 6 | 6.50 | 38 | 8.75 |
| 16 | 69.38% | 24 | 30.21 | 26 | 6.49 | 17 | 8.44 |
| 17 | 67.34% | 42 | 30.15 | 3 | 6.45 | 29 | 8.42 |
| 18 | 65.30% | 43 | 30.13 | 21 | 6.16 | 26 | 6.96 |
| 19 | 63.26% | 50 | 29.58 | 31 | 6.03 | 40 | 6.91 |
| 20 | 61.22% | 34 | 29.12 | 20 | 5.96 | 18 | 6.72 |
| 21 | 59.16% | 38 | 29.07 | 8 | 5.78 | 31 | 6.72 |
| 22 | 57.14% | 49 | 28.36 | 28 | 5.74 | 33 | 6.64 |
| 23 | 55.10% | 32 | 27.83 | 2 | 5.56 | 21 | 6.36 |
| 24 | 53.06% | 26 | 27.71 | 11 | 5.45 | 30 | 6.32 |
| 25 | 61.02% | 47 | 27.42 | 38 | 5.34 | 37 | 6.19 |
| 26 | 48.97% | 31 | 26.76 | 5 | 5.28 | 25 | 5.86 |
| 27 | 46.93% | 25 | 26.33 | 33 | 5.23 | 20 | 5.81 |
| 28 | 44.89% | 29 | 26.01 | 15 | 5.21 | 35 | 5.53 |
| 29 | 42.85% | 46 | 21.75 | 13 | 5.21 | 19 | 4.98 |
| 30 | 40.81% | 44 | 21.58 | 32 | 4.92 | 28 | 4.74 |

TABLE 4-continued

| Rank | Percent | Particle 1 Pixel # | Particle 1 Int. | Particle 2 Pixel # | Particle 2 Int. | Particle 3 Pixel # | Particle 3 Int. |
|---|---|---|---|---|---|---|---|
| 31 | 38.77% | 15 | 15.12 | 36 | 4.87 | 22 | 4.70 |
| 32 | 36.73% | 18 | 14.82 | 18 | 4.65 | 39 | 4.17 |
| 33 | 34.69% | 16 | 13.26 | 22 | 4.61 | 34 | 4.02 |
| 34 | 32.65% | 6 | 12.66 | 14 | 4.55 | 27 | 2.96 |
| 35 | 30.61% | 3 | 12.24 | 12 | 4.47 | 8 | 2.83 |
| 36 | 28.57% | 19 | 11.36 | 4 | 4.39 | 1 | 2.64 |
| 37 | 26.53% | 9 | 10.12 | 27 | 4.38 | 2 | 2.60 |
| 38 | 24.48% | 12 | 9.99 | 24 | 4.38 | 6 | 2.46 |
| 39 | 22.44% | 4 | 9.38 | 19 | 4.25 | 13 | 2.30 |
| 40 | 20.40% | 14 | 9.16 | 17 | 4.25 | 15 | 2.25 |
| 41 | 18.36% | 17 | 9.04 | 35 | 4.19 | 5 | 2.25 |
| 42 | 16.32% | 11 | 8.94 | 9 | 4.18 | 7 | 2.23 |
| 43 | 14.28% | 13 | 8.78 | 37 | 4.01 | 9 | 2.15 |
| 44 | 12.24% | 20 | 8.64 | 39 | 3.96 | 12 | 2.07 |
| 45 | 10.20% | 1 | 8.55 | 1 | 3.77 | 11 | 1.98 |
| 46 | 8.16% | 5 | 8.28 | 16 | 3.47 | 3 | 1.92 |
| 47 | 6.12% | 7 | 8.04 | 30 | 3.43 | 16 | 1.90 |
| 48 | 4.08% | 10 | 7.90 | 23 | 3.42 | 14 | 1.86 |
| 49 | 2.04% | 2 | 6.98 | 7 | 3.14 | 4 | 1.82 |
| 50 | 0.00% | 8 | 6.46 | 25 | 2.87 | 10 | 1.66 | where Rank is the order in sequence by the intensity of the pixel, Pixel# is the number of the pixel from Table 1, Intensity is the value of the intensity for the corresponding Pixel# from Table 1, and Percent is the percent of particles that would have intensity value shown under Intensity or less.

Thus, the pixel having the Rank of 3 for Particle is Pixel# 45 from Table 1. Pixel# 45 for Particle 1 has an intensity value of 34.80. Further 95.91% of all pixels in Particle 1 have intensity values of 34.80 or less.

If the number of "bins" or fractions, M is chosen to be 10 (the same as the example based upon a cumulative histogram calculation), and N-number of pixels=50, then $$\frac{i-1}{10} < \frac{k_i}{50} \leq \frac{i}{10}$$

where i is the $i^{th}$ bin. If i=10

$$\frac{9}{10} < \frac{k_{10}}{50} \leq 1$$

$k_{10}$=46, 47, 48, 49, 50.

If we choose $k_{10}$=50, then $P_{k10}$=6.46, 2.87, 1.66 for particles #1, #2 and #3, respectively.

Since $P_{k10}$=2.87 for particle #2 clearly differs from $P_{k10}$=1.66 for particle #3, particles #2 and #3 can be differentiated, while other statistical based analysis such as histogram, and cumulative histogram are unable to differentiate the particles. Furthermore, although a single value was compared, clearly a range of values can be compared. Note that the same holds true for $P_{k9}$ ($K_9$=45)=8.55, 3.77, 1.98 and $P_{k9}$($K_8$=40)=9.16, 4.25, 2.25 for particles #1, #2 and #3 respectfully.

Figure 6:
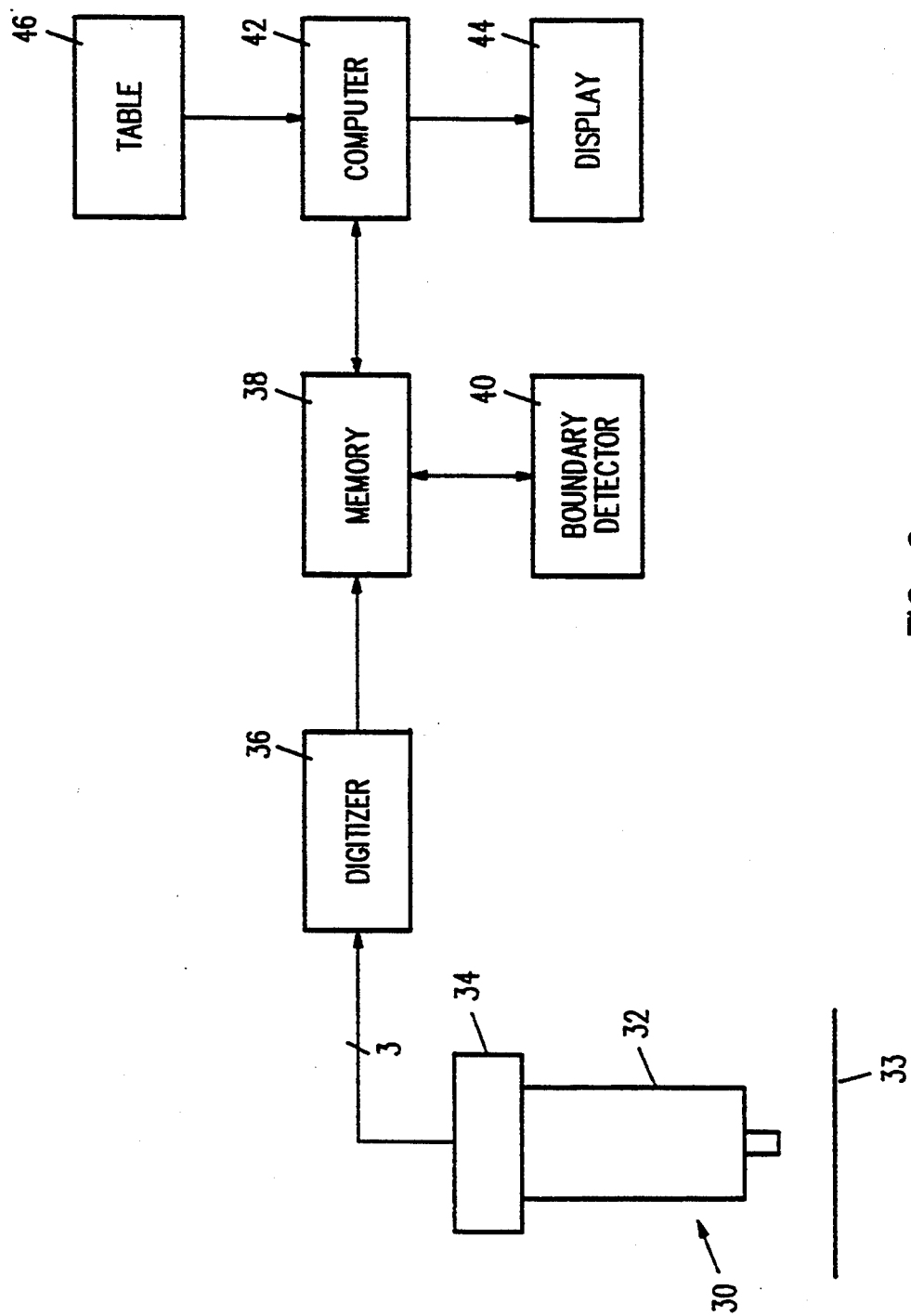
FIG. 6 is a block diagram of an apparatus suitable for carrying out the method of the present invention.

An apparatus 30 suitable for carrying out the method of the present invention is shown in FIG. 6. The apparatus 30 comprises a microscope 32, which is focused on an examination area 33. The examination area can be a microscopic slide or a flow cell such as that disclosed in U.S. Pat. No. 4,338,024. A camera 34 is attached to the microscope 32 and is adapted to image a portion of a suspension having a particle therein. The camera 34 is preferably of a raster scan type and may be a CCD camera model XC-711 manufactured by Sony. The camera 34 can form an electrical image of the field of view as seen through the microscope 32. Further, the camera 34 segments the image into a plurality of pixels, with an electrical signal corresponding to each pixel of the image. The camera 34 also outputs a plurality of signals (3) one for each of the colors (Red, Blue, and Green).

Each of the signals from the camera 34 is supplied to a digitizer 36, which digitizes the image intensity of each pixel into an electrical signal representing the grey scale value. Preferably, the pixel is digitized into a gray scale value between 0 and 255, inclusive.

From the digitizer, the digitized gray scale value is supplied to a memory 38, where the values are stored. The memory 36 can be a RAM. A boundary detector 40, such as that disclosed in U.S. Pat. No. 4,538,299 operates on the image in the memory 38 and detects the boundary of the image detected. The result is also stored in the memory 38.

From the memory 38, a computer 42 operates on the image and measures a parameter, such as intensity of light, of each pixel within the boundary detected.

In the event the apparatus 30 seeks to determine the identity of a single particle under examination, then the particular quantile value derived by the computer 42 is compared to the table of stored values 46 of previously identified particles. The table 46 can be a ROM or another memory. The result can be displayed on the display 44.

In the event the apparatus 30 seeks to differentiate a plurality of objects under examination, then a quantile is developed for the same parameter for each of the pixels in the boundary of each of the images of the different objects. From the quantile, the particles under examination can be differentiated from one another. The result can be displayed on the display 44.

The computer 42 carries out its tasks in accordance with a computer program. A copy of a program to compute quantiles written in the C language for execution under the MS-DOS operating system is as follows:

```
1  /*     cca.h()         Block Diagram Software                    cca.h()
2  **
3  **     Programmer:     H. L. Kasdan
4  **
5  **     Copyright :     1987 by Harvey L. Kasdan
6  **
7  ************************************************************************
8  **
9  **     NAME
10 **            cca.h - chain code analysis header file
11 **
12 **     SYNOPSIS
13 **
14 **     DESCRIPTION
15 **
16 **     SEE ALSO
17 **
18 **     DIAGNOSTICS
19 **
20 **     BUGS
21 **
22 **     REVISION HISTORY
23 **
24 ************************************************************************
25 */
26 /*
27 ************************************************************************
28 **                          DEFINES
29 ************************************************************************
30 */
31 #define MAXX 60
32 #define MAXY 60
33 /*
34 ************************************************************************
35 **                      STRUCTURE DEFINITION
36 ************************************************************************
37 */
38 struct ccdef {
39          char ccang;         /* angular position of next point 0 - 7 */
40          int x;              /* x-position of current point */
41          int y;              /* y-position of current point */
42          };                  /* chain code definition structure */
43
44 typedef char n8group[9];     /* 8-group of characters (pixels) */
45
46 typedef struct {
```

```
47                 int px;                    /* x-coordinate */
48                 int py;                    /* y-coordinate */
49         } point;                           /* point coordinates */
50
51 typedef point n8points[9];                 /* array of central point and 8 neighbors */
52
53 /*
54 ************************************************************************
55 **                      SUBROUTINE DECLARATIONS
56 ************************************************************************
57 */
58 int ccabox0();
59 int ccabrk0();
60 int ccaconsc();
61 int ccaconss();
62 int ccadcon0();
63 int ccadetp0();
64 int ccadilate();
65 int ccadiss1();
66 int ccadisst();
67 int ccaenter();
68 int ccaerod1();
69 int ccaerode();
70 int ccafilin();
71 int ccafili1();
72 int ccafili2();
73 void ccafill0();
74 int ccan8bf0();
75 int ccan8fol();
76
77
```

```
1  /*    ndap.h()       Block Diagram Software         ndap.h()
2  **
3  **    Programmer:    H. L. Kasdan
4  **
5  **    Copyright :    (C) 1988 by
6  **                   International Remote Imaging Systems Inc.
7  **
8  ************************************************************************
9  **
10 **    NAME
11 **           ndap.h - NIH data analysis header file
12 **
13 **    SYNOPSIS
14 **
15 **    DESCRIPTION
16 **
17 **    SEE ALSO
18 **
19 **    DIAGNOSTICS
20 **
21 **    BUGS
22 **
23 **    REVISION HISTORY
24 **
25 ************************************************************************
26 */
27 /*
28 ************************************************************************
29 **                      DEFINES
30 ************************************************************************
31 */
32 #define CAXMAX 50                  /* cell array x-maximum */
33 #define CAYMAX 50                  /* cell array y-maximum */
34 /*
35 ************************************************************************
36 **                      STRUCTURE DEFINITION
37 ************************************************************************
38 */
39 struct image0 {
40         char fname[14];                    /* cell data file name and extension */
41         int cellno;                /* cell number */
42         long int riod;             /* red iod */
43         long int giod;             /* green iod */
44         long int biod;             /* blue iod */
45         long int riot;             /* red iot */
46         long int giot;             /* green iot */
47         long int biot;             /* blue iot */
48         int carea;                 /* cell area */
49         int window;                /* box window size */
```

```
50          int thresh;                         /* edge trace threshold */
51          char ctype[12];                     /* cell type */
52          int cx0;                            /* cell trace starting x-position */
53          int cy0;                            /* cell trace starting y-position */
54          int cxmin;                          /* cell trace minimum x-position */
55          int cymin;                          /* cell trace minimum y-position */
56          int cxmax;                          /* cell trace maximum x-position */
57          int cymax;                          /* cell trace maximum y-position */
58          int cpie;                           /* cell points in edge */
59          char ccc[256];                      /* cell chain code */
60          unsigned char crimg[CAYMAX][CAXMAX];     /* cell red image */
61          unsigned char cgimg[CAYMAX][CAXMAX];     /* cell green image */
62          unsigned char cbimg[CAYMAX][CAXMAX];     /* cell blue image */
63          unsigned char cnrimg[CAYMAX][CAXMAX];    /* cell normalized red image */
64          unsigned char cngimg[CAYMAX][CAXMAX];    /* cell normalized green image */
65          unsigned char cnbimg[CAYMAX][CAXMAX];    /* cell normalized blue image */
66          int lgmlr[CAYMAX][CAXMAX];          /* log green minus log red image */
67          int lbmlg[CAYMAX][CAXMAX];          /* log blue minus log green image */
68          int lrmlb[CAYMAX][CAXMAX];          /* log red minus log blue image */
69          int qclgmlr[50];    /* log green minus log red cell quantiles */
70          int qclbmlg[50];    /* log blue minus log green cell quantiles */
71          int qclrmlb[50];    /* log red minus log blue cell quantiles */
72          int mclgmlr;        /* log green minus log red cell pixel mean */
73          int mclbmlg;        /* log blue minus log green cell pixel mean */
74          int mclrmlb;        /* log red minus log blue cell pixel mean */
75          int sdclgmlr;       /* log green minus log red cell pixel std dev */
76          int sdclbmlg;       /* log blue minus log green cell pixel std dev */
77          int sdclrmlb;       /* log red minus log blue cell pixel std dev */
78          char ccimg[CAYMAX][CAXMAX];         /* cell chain code image */
79          struct ccdef cccimg[256];           /* cell chain code struct */
80          };      /* image0 - cell image data structure */
81 struct hist0 {
82          unsigned int rhist0[256];           /* red image histogram */
83          unsigned int ghist0[256];           /* green image histogram */
84          unsigned int bhist0[256];           /* blue image histogram */
85          unsigned int rihist0[256];          /* red image interior histogram */
86          unsigned int gihist0[256];          /* green image interior histogram */
87          unsigned int bihist0[256];          /* blue image interior histogram */
88          unsigned int rehist0[256];          /* red image exterior histogram */
89          unsigned int gehist0[256];          /* green image exterior histogram */
90          unsigned int behist0[256];          /* blue image exterior histogram */
91          };              /* hist0 - cell image data histogram structure */
92 struct chist0 {
93          unsigned int crhist0[256];          /* red image cum histogram */
94          unsigned int cghist0[256];          /* green image cum histogram */
95          unsigned int cbhist0[256];          /* blue image cum histogram */
96          unsigned int crihist0[256];         /* red image interior cum histogram */
97          unsigned int cgihist0[256];         /* green image interior cum histogram */
98          unsigned int cbihist0[256];         /* blue image interior cum histogram */
99          unsigned int crehist0[256];         /* red image exterior cum histogram */
100         unsigned int cgehist0[256];         /* green image exterior cum histogram */
101         unsigned int cbehist0[256];         /* blue image exterior cum histogram */
102         };              /* chist0 - cell image data histogram structure */
103 struct qt10 {
104         unsigned int qr0[50];   /* red image quantiles */
105         unsigned int qg0[50];   /* green image quantiles */
106         unsigned int qb0[50];   /* blue image quantiles */
107         unsigned int qri0[50];  /* red image interior quantiles */
108         unsigned int qgi0[50];  /* green image interior quantiles */
109         unsigned int qbi0[50];  /* blue image interior quantiles */
110         unsigned int qre0[50];  /* red image exterior quantiles */
111         unsigned int qge0[50];  /* green image exterior quantiles */
112         unsigned int qbe0[50];  /* blue image exterior quantiles */
113         unsigned int mr0;       /* red image mean */
114         unsigned int mg0;       /* green image mean */
115         unsigned int mb0;       /* blue image mean */
116         unsigned int mri0;      /* red image interior mean */
117         unsigned int mgi0;      /* green image interior mean */
118         unsigned int mbi0;      /* blue image interior mean */
119         unsigned int mre0;      /* red image exterior mean */
120         unsigned int mge0;      /* green image exterior mean */
121         unsigned int mbe0;      /* blue image exterior mean */
122         unsigned int sdr0;      /* red image std deviation */
123         unsigned int sdg0;      /* green image std deviation */
124         unsigned int sdb0;      /* blue image std deviation */
125         unsigned int sdri0;     /* red image interior std deviation */
126         unsigned int sdgi0;     /* green image interior std deviation */
127         unsigned int sdbi0;     /* blue image interior std deviation */
128         unsigned int sdre0;     /* red image exterior std deviation */
129         unsigned int sdge0;     /* green image exterior std deviation */
130         unsigned int sdbe0;     /* blue image exterior std deviation */
```

```
131                };              /* qt10 - cell image data quantile structure */
132 /*
133 ********************************************************************
134 **                    SUBROUTINE DECLARATIONS
135 ********************************************************************
136 */
137 char *lbltbl();
1   /*      ndaph0()        Analysis Software              ndaph0()
2   **
3   **      Programmer:     H. L. Kasdan
4   **
5   **      Copyright :     1988 by
6   **                      International Remote Imaging Systems, Inc.
7   **
8   ********************************************************************
9   **
10  **      NAME
11  **              ndaph0 - image histogram routine
12  **
13  **      SYNOPSIS
14  **              #include <stdio.h>
15  **              #include <string.h>
16  **              #include "cca.h"
17  **              #include "ndap.h"
18  **              int ndaph0( int mode, struct image0 *p_image0,
19  **                          struct hist0 *p_hist0, struct chist0 *p_chist0 )
20  **              int mode;                       histogram formation mode
21  **              struct image0 *p_image0;        pointer to image0 data structure
22  **              struct hist0 *p_hist0;          pointer to hist0 data structure
23  **              struct chist0 *p_chist0;        pointer to chist0 data structure
24  **
25  **      DESCRIPTION
26  **              Routine generates histogram to hist0 data structure
27  **              using data from image0 data structure according to
28  **              specified mode.
29  **              mode            operation
30  **              ----            ---------
31  **              0               use un-normalized image data from image0
32  **              1               use normalized image data from image0
33  **
34  **      SEE ALSO
35  **
36  **      DIAGNOSTICS
37  **
38  **      BUGS
39  **
40  **      REVISION HISTORY
41  **              900507  hlk     modified for *.URN file precursor to use window size
42  **
43  ********************************************************************
44  */
45  #include <stdio.h>
46  #include <string.h>
47  #include "cca.h"
48  #include "ndap.h"
49  #define FALSE 0
50  #define TRUE  1
51  #define PMAXX 50
52  #define PMAXY 50
53  #define PMINX 0
54  #define PMINY 0
55
56
57  int ndaph0( mode, p_image0, p_hist0, p_chist0 )
58      int mode;                       /* histogram formation mode */
59      struct image0 *p_image0;        /* pointer to image0 data structure */
60      struct hist0 *p_hist0;          /* pointer to hist0 data structure */
61      struct chist0 *p_chist0;        /* pointer to chist0 data structure */
62  {
63  /*
64  ********************************************************************
65  **                      LOCAL STORAGE
66  ********************************************************************
67  */
68      int err = 0;                    /* error return */
69      int i;                          /* generic index */
70      int x;                          /* x-coordinate value */
71      int y;                          /* y-coordinate value */
72  /*
```

```
73   /****************************************************************
74   **          Do Histogram According to Mode
75   ****************************************************************
76   */
77   switch (mode)
78     {
79     case 1:                  /* normalized image is data source */
80
81       for ( i = 0; i < 256; i++)
82       {
83         p_hist0->rhist0[i] = 0;
84         p_hist0->ghist0[i] = 0;
85         p_hist0->bhist0[i] = 0;
86         p_hist0->rihist0[i] = 0;
87         p_hist0->gihist0[i] = 0;
88         p_hist0->bihist0[i] = 0;
89         p_hist0->rehist0[i] = 0;
90         p_hist0->gehist0[i] = 0;
91         p_hist0->behist0[i] = 0;
92       } /* end - for ( i = 0; i < 256; i++) */
93
94       for (y = PMINY; y < p_image0->window; y++)
95       {
96       for (x = PMINX; x < p_image0->window; x++)
97         {
98           p_hist0->rhist0[(int)p_image0->cnrimg[y][x]] += 1;
99           p_hist0->ghist0[(int)p_image0->cngimg[y][x]] += 1;
100          p_hist0->bhist0[(int)p_image0->cnbimg[y][x]] += 1;
101        if ((p_image0->ccimg[y][x] == 'x') ||
102           (((p_image0->ccimg[y][x] >= '0') && (p_image0->ccimg[y][x] < '8'))))
103          {
104          /*
105          **       Do Interior
106          */
107            p_hist0->rihist0[(int)p_image0->cnrimg[y][x]] += 1;
108            p_hist0->gihist0[(int)p_image0->cngimg[y][x]] += 1;
109            p_hist0->bihist0[(int)p_image0->cnbimg[y][x]] += 1;
110          } /* end - if (... || ...) */
111        else
112          {
113          /*
114          **       Do Exterior
115          */
116            p_hist0->rehist0[(int)p_image0->cnrimg[y][x]] += 1;
117            p_hist0->gehist0[(int)p_image0->cngimg[y][x]] += 1;
118            p_hist0->behist0[(int)p_image0->cnbimg[y][x]] += 1;
119          } /* end - else (... || ...) */
120        } /* end - for (x = PMINX; x < p_image0->window; x++) */
121      } /* end - for (y = PMINY; y < p_image0->window; y++) */
122
123      /*
124      **       Compute Cumulative Histogram
125      */
126      p_chist0->crhist0[0] = p_hist0->rhist0[0];
127      p_chist0->cghist0[0] = p_hist0->ghist0[0];
128      p_chist0->cbhist0[0] = p_hist0->bhist0[0];
129      p_chist0->crihist0[0] = p_hist0->rihist0[0];
130      p_chist0->cgihist0[0] = p_hist0->gihist0[0];
131      p_chist0->cbihist0[0] = p_hist0->bihist0[0];
132      p_chist0->crehist0[0] = p_hist0->rehist0[0];
133      p_chist0->cgehist0[0] = p_hist0->gehist0[0];
134      p_chist0->cbehist0[0] = p_hist0->behist0[0];
135
136      for ( i = 1; i < 256; i++)
137      {
138        p_chist0->crhist0[i] = p_hist0->rhist0[i] + p_chist0->crhist0[i - 1];
139        p_chist0->cghist0[i] = p_hist0->ghist0[i] + p_chist0->cghist0[i - 1];
140        p_chist0->cbhist0[i] = p_hist0->bhist0[i] + p_chist0->cbhist0[i - 1];
141        p_chist0->crihist0[i] = p_hist0->rihist0[i] + p_chist0->crihist0[i - 1];
142        p_chist0->cgihist0[i] = p_hist0->gihist0[i] + p_chist0->cgihist0[i - 1];
143        p_chist0->cbihist0[i] = p_hist0->bihist0[i] + p_chist0->cbihist0[i - 1];
144        p_chist0->crehist0[i] = p_hist0->rehist0[i] + p_chist0->crehist0[i - 1];
145        p_chist0->cgehist0[i] = p_hist0->gehist0[i] + p_chist0->cgehist0[i - 1];
146        p_chist0->cbehist0[i] = p_hist0->behist0[i] + p_chist0->cbehist0[i - 1];
147      } /* end - for ( i = 0; i < 256; i++) */
148      break;
149
150    case 0: default:              /* use un-normalized image data */
151
152      for ( i = 0; i < 256; i++)
153      {
```

```
154            p_hist0->rhist0[i] = 0;
155            p_hist0->ghist0[i] = 0;
156            p_hist0->bhist0[i] = 0;
157            p_hist0->rihist0[i] = 0;
158            p_hist0->gihist0[i] = 0;
159            p_hist0->bihist0[i] = 0;
160            p_hist0->rehist0[i] = 0;
161            p_hist0->gehist0[i] = 0;
162            p_hist0->behist0[i] = 0;
163        } /* end - for ( i = 0; i < 256; i++) */
164
165        for (y = PMINY; y < p_image0->window; y++)
166        {
167        for (x = PMINX; x < p_image0->window; x++)
168          {
169            p_hist0->rhist0[(int)p_image0->crimg[y][x]] += 1;
170            p_hist0->ghist0[(int)p_image0->cgimg[y][x]] += 1;
171            p_hist0->bhist0[(int)p_image0->cbimg[y][x]] += 1;
172            if ((p_image0->ccimg[y][x] == 'x') ||
173                (((p_image0->ccimg[y][x] >= '0') && (p_image0->ccimg[y][x] < '8'))))
174            {
175            /*
176            **        Do Interior
177            */
178                p_hist0->rihist0[(int)p_image0->crimg[y][x]] += 1;
179                p_hist0->gihist0[(int)p_image0->cgimg[y][x]] += 1;
180                p_hist0->bihist0[(int)p_image0->cbimg[y][x]] += 1;
181            } /* end - if (... || ...) */
182            else
183            {
184            /*
185            **        Do Exterior
186            */
187                p_hist0->rehist0[(int)p_image0->crimg[y][x]] += 1;
188                p_hist0->gehist0[(int)p_image0->cgimg[y][x]] += 1;
189                p_hist0->behist0[(int)p_image0->cbimg[y][x]] += 1;
190            } /* end - else (... || ...) */
191          } /* end - for (x = PMINX; x < p_image0->window; x++) */
192        } /* end - for (y = PMINY; y < p_image0->window; y++) */
193
194        /*
195        **              Compute Cumulative Histogram
196        */
197        p_chist0->crhist0[0] = p_hist0->rhist0[0];
198        p_chist0->cghist0[0] = p_hist0->ghist0[0];
199        p_chist0->cbhist0[0] = p_hist0->bhist0[0];
200        p_chist0->crihist0[0] = p_hist0->rihist0[0];
201        p_chist0->cgihist0[0] = p_hist0->gihist0[0];
202        p_chist0->cbihist0[0] = p_hist0->bihist0[0];
203        p_chist0->crehist0[0] = p_hist0->rehist0[0];
204        p_chist0->cgehist0[0] = p_hist0->gehist0[0];
205        p_chist0->cbehist0[0] = p_hist0->behist0[0];
206
207        for ( i = 1; i < 256; i++)
208        {
209            p_chist0->crhist0[i] = p_hist0->rhist0[i] + p_chist0->crhist0[i - 1];
210            p_chist0->cghist0[i] = p_hist0->ghist0[i] + p_chist0->cghist0[i - 1];
211            p_chist0->cbhist0[i] = p_hist0->bhist0[i] + p_chist0->cbhist0[i - 1];
212            p_chist0->crihist0[i] = p_hist0->rihist0[i] + p_chist0->crihist0[i - 1];
213            p_chist0->cgihist0[i] = p_hist0->gihist0[i] + p_chist0->cgihist0[i - 1];
214            p_chist0->cbihist0[i] = p_hist0->bihist0[i] + p_chist0->cbihist0[i - 1];
215            p_chist0->crehist0[i] = p_hist0->rehist0[i] + p_chist0->crehist0[i - 1];
216            p_chist0->cgehist0[i] = p_hist0->gehist0[i] + p_chist0->cgehist0[i - 1];
217            p_chist0->cbehist0[i] = p_hist0->behist0[i] + p_chist0->cbehist0[i - 1];
218        } /* end - for ( i = 0; i < 256; i++) */
219        break;
220    } /* end - switch (mode) */
221
222    return(err);
223
224  } /* end - int ndaph0(char *cs) */
```

```
1  /*      ndapctq0()      Analysis Software               ndapctq0()
2  **
3  **      Programmer:     H. L. Kasdan
4  **
5  **      Copyright :     1988 by
6  **                      International Remote Imaging Systems, Inc.
7  **
8  **********************************************************************
9  **
10 **     NAME
11 **             ndapctq0 - produce cum hist quantiles and statistics routine
12 **
13 **     SYNOPSIS
14 **             #include <stdio.h>
15 **             #include <string.h>
16 **             #include "cca.h"
17 **             #include "ndap.h"
18 **             int ndapctq0( struct chist0 *p_chist0, struct qt10 *p_qt10 )
19 **             struct chist0 *p_chist0;        pointer to chist0 data structure
20 **             struct qt10 *p_qt10;    pointer to qt10 data structure
21 **
22 **     DESCRIPTION
23 **             Routine generates quantiles of cell
24 **             image data using data from chist0 data structure.
25 **
26 **     SEE ALSO
27 **
28 **     DIAGNOSTICS
29 **
30 **     BUGS
31 **
32 **     REVISION HISTORY
33 **
34 **********************************************************************
35 */
36 #include <math.h>
37 #include <stdio.h>
38 #include <string.h>
39 #include "cca.h"
40 #include "ndap.h"
41 #define BNPCT 95
42 #define BOFF 28
43 #define GNPCT 95
44 #define GOFF 21
45 #define FALSE 0
46 #define NVALUE 200                      /* normalized maximum image value */
47 #define PMAXX 46
48 #define PMAXY 46
49 #define PMINX 2
50 #define PMINY 2
51 #define RNPCT 95
52 #define ROFF 25
53 #define TRUE 1
54
55 void ndapqnt1();
56 void ndapmsd1();
57
58 int ndapctq0( p_chist0, p_qt10 )
59   struct chist0 *p_chist0;      /* pointer to chist0 data structure */
60   struct qt10 *p_qt10;          /* pointer to qt10 data structure */
61 {
62
63 /*
64 **********************************************************************
65 **                      LOCAL STORAGE
66 **********************************************************************
67 */
68   int err = 0;                  /* error return */
69   int i;                        /* generic index */
70   int n;                        /* number of interior pixels - length of index
71                                    array */
72 /*
73 **********************************************************************
74 **                      Compute Statistics for 9 images
75 **********************************************************************
76 */
77 /*
78 **                      r Cell Image
79 */
80   ndapqnt1(&p_chist0->crhist0[0], &p_qt10->qr0[0]);
```

```
81      ndapmsd1(&p_chist0->crhist0[0],
82              &p_qt10->mr0, &p_qt10->sdr0);
83
84      /*
85      **                      g Cell Image
86      */
87      ndapqnt1(&p_chist0->cghist0[0], &p_qt10->qg0[0]);
88      ndapmsd1(&p_chist0->cghist0[0],
89              &p_qt10->mg0, &p_qt10->sdg0);
90
91      /*
92      **                      b Cell Image
93      */
94      ndapqnt1(&p_chist0->cbhist0[0], &p_qt10->qb0[0]);
95      ndapmsd1(&p_chist0->cbhist0[0],
96              &p_qt10->mb0, &p_qt10->sdb0);
97
98      /*
99      **                      ri Cell Image
100     */
101     ndapqnt1(&p_chist0->crihist0[0], &p_qt10->qri0[0]);
102     ndapmsd1(&p_chist0->crihist0[0],
103             &p_qt10->mri0, &p_qt10->sdri0);
104
105     /*
106     **                      gi Cell Image
107     */
108     ndapqnt1(&p_chist0->cgihist0[0], &p_qt10->qgi0[0]);
109     ndapmsd1(&p_chist0->cgihist0[0],
110             &p_qt10->mgi0, &p_qt10->sdgi0);
111
112     /*
113     **                      bi Cell Image
114     */
115     ndapqnt1(&p_chist0->cbihist0[0], &p_qt10->qbi0[0]);
116     ndapmsd1(&p_chist0->cbihist0[0],
117             &p_qt10->mbi0, &p_qt10->sdbi0);
118
119     /*
120     **                      re Cell Image
121     */
122     ndapqnt1(&p_chist0->crehist0[0], &p_qt10->qre0[0]);
123     ndapmsd1(&p_chist0->crehist0[0],
124             &p_qt10->mre0, &p_qt10->sdre0);
125
126     /*
127     **                      ge Cell Image
128     */
129     ndapqnt1(&p_chist0->cgehist0[0], &p_qt10->qge0[0]);
130     ndapmsd1(&p_chist0->cgehist0[0],
131             &p_qt10->mge0, &p_qt10->sdge0);
132
133     /*
134     **                      be Cell Image
135     */
136     ndapqnt1(&p_chist0->cbehist0[0], &p_qt10->qbe0[0]);
137     ndapmsd1(&p_chist0->cbehist0[0],
138             &p_qt10->mbe0, &p_qt10->sdbe0);
139
140
141     return(err);
142
143     } /* end - int ndapctq0(char *cs) */
144
145     /*  ndapqnt1()      Analysis Software              ndapqnt1()
146     **
147     ** Programmer:   H. L. Kasdan
148     **
149     ** Copyright :   1988 by
150     **               International Remote Imaging Systems, Inc.
151     **
152     ***********************************************************
153     **
154     ** NAME
155     **       ndapqnt1 - compute quantiles from cumulative histogram
156     **
157     ** SYNOPSIS
158     **         #include <stdio.h>
159     **         #include <string.h>
160     **         #include "cca.h"
161     **         #include "ndap.h"
```

```
162 **          void ndapqnt1( unsigned int chist[256] int quant[50])
163 **              unsigned int chist[256];        cumulative histogram array
164 **          int quant[50];                      arrray in which 50 quantiles
165 **                                              will be returned
166 **
167 **  DESCRIPTION
168 **          Routine orders determines quantiles from cumulative histogram
169 **              array.
170 **
171 **  SEE ALSO
172 **
173 **  DIAGNOSTICS
174 **
175 **  BUGS
176 **
177 **  REVISION HISTORY
178 **
179 ***********************************************************************
180 */
181 void ndapqnt1( chist, quant)
182    unsigned int chist[256];     /* cumulative histogram array */
183    int quant[50];               /* arrray in which 50 quantiles
184                                     will be returned */
185
186
187    {
188    /*
189    ***********************************************************************
190    **                          LOCAL STORAGE
191    ***********************************************************************
192    */
193    long int cj;                      /* target cum hist value for next quantile */
194    int i;
195    int j0 = 0;                       /* quantile index */
196    long int l50 = 50;                /* number of quantiles */
197    long int maxnum = chist[255];     /* total number of values in histgram */
198    int n = 256;                      /* size of histogram array */
199    /*
200    **                         Generate Quantiles
201    */
202    cj = (((long int)(j0 + 1)) * maxnum) / l50;
203    for (i = 1; (i <= n) && (j0 < 50); i++)
204       {
205       while (((unsigned int)cj <= chist[i]) && (j0 < 50))
206          {
207          quant[j0++] = i;
208          cj = (((long int)(j0 + 1)) * maxnum) / l50;
209          } /* end - while ((jnext - j0++) > 1) */
210
211       } /* end - for (i = 1; i <= n; i++) */
212    } /* end - void ndapqnt1( int n, int arrin[], int indx[]) */
213
214
215 /*  ndapmsd1()         Analysis Software                  ndapmsd1()
216 **
217 ** Programmer:   H. L. Kasdan
218 **
219 ** Copyright :   1988 by
220 **          International Remote Imaging Systems, Inc.
221 **
222 ***********************************************************************
223 **
224 ** NAME
225 **          ndapmsd1 - compute mean and std deviation
226 **
227 ** SYNOPSIS
228 **          #include <math.h>
229 **          #include <stdio.h>
230 **          #include <string.h>
231 **          #include "cca.h"
232 **          #include "ndap.h"
233 **          void ndapmsd1( unsigned int chist[256], int *mean,
234 **                         int *sdev)
235 **              unsigned int chist[256];        cum histogram array
236 **          int *mean;                          mean value of specified
237 **                                              elements
238 **          int *sdev;                          standard deviation of
239 **                                              specified elements
240 **
```

```
241 **   DESCRIPTION
242 **          Routine computes mean and standard deviation of
243 **          image from cumulative histogram.
244 **
245 **   SEE ALSO
246 **
247 **   DIAGNOSTICS
248 **
249 **   BUGS
250 **
251 **   REVISION HISTORY
252 **
253 ***********************************************************
254 */
255 void ndapmsd1( chist, mean, sdev)
256     unsigned int chist[256];    /* cum histogram array */
257     int *mean;                  /* mean value of specified
258                                    elements */
259     int *sdev;                  /* standard deviation of
260                                    specified elements */
261
262
263 {
264 /*
265 ***********************************************************
266 **                      LOCAL STORAGE
267 ***********************************************************
268 */
269     int chvalue;                /* current histogram value */
270     double di;                  /* double index */
271     double dmean;               /* running first moment */
272     int dopixel;                /* previous temp pixel value */
273     double dpixel;              /* temp pixel value */
274     double dnt = (double)chist[255]; /* total number of points in histogram */
275     double dsdev;               /* double std dev */
276     double dsm;                 /* running second moment */
277     int i;
278     int n = 256;                /* histogram array size */
279 /*
280 **                      Compute Moments
281 */
282     dmean = 0.;
283     dsm   = 0.;
284     dopixel = 0.;
285     for (i = 0; i < n; i++)
286       {
287       chvalue = (int)chist[i];
288       dpixel = (double)(chvalue - dopixel);
289       if (dpixel != 0.)
290         {
291         di = (double)i;
292         dmean += dpixel * di;
293         dsm += dpixel * di * di;
294         } /* end - if (dpixel != 0.) */
295       dopixel = chvalue;
296       } /* end - for (i = 1; i <= n; i++) */
297     dmean /= dnt;
298     *mean = (int)dmean;
299     dsm /= dnt;
300     dsdev = dsm - (dmean * dmean);
301     dsdev = (dsdev >= (double)0.) ? dsdev : (double)0.;
302     dsdev = sqrt(dsdev);
303     *sdev = (int)dsdev;
304     } /* end - void ndapmsd1( int n, int arrin[], int indx[]) */
305

1 /*      ndapmlq0()      Analysis Software              ndapmlq0()
2 **
3 **      Programmer:     H. L. Kasdan
4 **
5 **      Copyright :     1988 by
6 **                      International Remote Imaging Systems, Inc.
7 **
8 ***********************************************************
9 **
10 **     NAME
11 **             ndapmlq0 - produce log image quantiles and statistics routine
12 **
13 **     SYNOPSIS
14 **             #include <stdio.h>
15 **             #include <string.h>
```

```
16 **              #include "cca.h"
17 **              #include "ndap.h"
18 **              int ndapmlq0( struct image0 *p_image0 )
19 **              struct image0 *p_image0;        pointer to image0 data structure
20 **
21 **     DESCRIPTION
22 **              Routine generates quantiles of log difference cell
23 **              image data using data from image0 data structure.
24 **              Modified heapsort algorithm is used to order pixel data.
25 **
26 **     SEE ALSO
27 **
28 **     DIAGNOSTICS
29 **
30 **     BUGS
31 **
32 **     REVISION HISTORY
33 **              900507   hlk      modified for *.URN precursor to use window value
34 **
35 *********************************************************************
36 */
37 #include <math.h>
38 #include <stdio.h>
39 #include <string.h>
40 #include "cca.h"
41 #include "ndap.h"
42 #define BNPCT 95
43 #define BOFF 28
44 #define GNPCT 95
45 #define GOFF 21
46 #define FALSE 0
47 #define NVALUE 200                    /* normalized maximum image value */
48 #define PMAXX 46
49 #define PMAXY 46
50 #define PMINX 2
51 #define PMINY 2
52 #define RNPCT 95
53 #define ROFF 25
54 #define TRUE 1
55
56 void indexx();
57 void ndapqnt0();
58 void ndapmsd0();
59
60 int ndapmlq0( p_image0 )
61    struct image0 *p_image0;     /* pointer to image0 data structure */
62 {
63 /*
64 *********************************************************************
65 **                   GLOBAL STORAGE
66 *********************************************************************
67 */
68    extern int ltab0[256];       /* precomputed log table values */
69
70 /*
71 *********************************************************************
72 **                   LOCAL STORAGE
73 *********************************************************************
74 */
75    int bnvalue;                         /* blue pixel normalizing value */
76    int err = 0;                         /* error return */
77    int i;                       /* generic index */
78    int indx[CAXMAX * CAYMAX + 1];       /* interior pixel index array */
79    int gnvalue;                         /* green pixel normalizing value */
80    long int lptmp;              /* temporary pixel value */
81    int n;                       /* number of interior pixels - length of index
82                                    array */
83    int rnvalue;                         /* red pixel normalizing value */
84    int x;                       /* x-coordinate value */
85    int y;                       /* y-coordinate value */
86 /*
87 *********************************************************************
88 **                   Generate Index Array
89 *********************************************************************
90 */
91    n = 0;                       /* index count */
92
93    for ( y = 0; y < p_image0->window; y++ )
94      {
95      for ( x = 0; x < p_image0->window; x++ )
```

```
 96     {
 97        if (((p_image0->ccimg[y][x] == 'x') ||
 98           (((p_image0->ccimg[y][x] >= '0') && (p_image0->ccimg[y][x] < '8')))))
 99        {
100        indx[++n] = (y * CAXMAX) + x;
101        } /* end - if (... || (...) && (...) ) */
102
103        } /* end - for ( x = 0; x < p_image0->window; x++ ) */
104        } /* end - for ( y = 0; y < p_image0->window; y++ ) */
105     /*
106     **                          lgmlr Cell Image
107     */
108     indexx(n, &p_image0->lgmlr[0][0], indx);   /* order index array for lgmlr */
109     ndapqnt0(n, &p_image0->lgmlr[0][0], indx, &p_image0->qclgmlr[0]);
110     ndapmsd0(n, &p_image0->lgmlr[0][0], indx,
111         &p_image0->mclgmlr, &p_image0->sdclgmlr);
112
113     /*
114     **                          lbmlg Cell Image
115     */
116     indexx(n, &p_image0->lbmlg[0][0], indx);   /* order index array for lbmlg */
117     ndapqnt0(n, &p_image0->lbmlg[0][0], indx, &p_image0->qclbmlg[0]);
118     ndapmsd0(n, &p_image0->lbmlg[0][0], indx,
119         &p_image0->mclbmlg, &p_image0->sdclbmlg);
120
121     /*
122     **                          lrmlb Cell Image
123     */
124     indexx(n, &p_image0->lrmlb[0][0], indx);   /* order index array for lrmlb */
125     ndapqnt0(n, &p_image0->lrmlb[0][0], indx, &p_image0->qclrmlb[0]);
126     ndapmsd0(n, &p_image0->lrmlb[0][0], indx,
127         &p_image0->mclrmlb, &p_image0->sdclrmlb);
128
129
130     return(err);
131
132     } /* end - int ndapmlq0(char *cs) */
133
134  /* indexx()          Analysis Software                  indexx()
135  **
136  ** Programmer:    H. L. Kasdan
137  **
138  ** Copyright :    1988 by
139  **                International Remote Imaging Systems, Inc.
140  **
141  *****************************************************************
142  **
143  ** NAME
144  **         indexx - order index array for log image data
145  **
146  ** SYNOPSIS
147  **         #include <stdio.h>
148  **         #include <string.h>
149  **         #include "cca.h"
150  **         #include "ndap.h"
151  **         void indexx( int n, int arrin[], int indx[])
152  **         int n;                       number of elements to be ordered
153  **         int arrin[];                 array containing elements to
154  **                                      be ordered
155  **         int indx[];                  array containing indecies of
156  **                                      elements in arrin that will
157  **                                      be ordered. This index array
158  **                                      will be ordered in place.
159  **
160  ** DESCRIPTION
161  **         Routine orders elements in array arrin specified in
162  **         index array, indx.
163  **
164  ** SEE ALSO
165  **
166  ** DIAGNOSTICS
167  **
168  ** BUGS
169  **
170  ** REVISION HISTORY
171  **
172  *****************************************************************
173  */
174  void indexx( n, arrin, indx)
175  int n;                      /* number of elements to be ordered */
```

```
176     int arrin[];                       /* array containing elements to
177                                        be ordered */
178     int indx[];                        /* array containing indecies of
179                                        elements in arrin that will
180                                        be ordered. This index array
181                                        will be ordered in place. */
182
183     {
184     /*
185     **********************************************************************
186     **                      LOCAL STORAGE
187     **********************************************************************
188     */
189     int i;
190     int indxt;
191     int ir;
192     int j;
193     int l;
194     int q;
195     /*
196     **                      Do heapsort
197     */
198     l = (n >> 1) + 1;
199     ir = n;
200
201     for (;;)
202       {
203
204       if (l > 1)
205          q = arrin[(indxt = indx[--l])];
206       else
207          {
208          q = arrin[(indxt = indx[ir])];
209          indx[ir] = indx[1];
210          if (--ir == 1)
211       {
212       indx[1] = indxt;
213       return;
214          } /* end - if (--ir == 1) */
215          } /* end - else (l > 1) */
216
217       i = l;
218       j = l << 1;
219
220       while (j <= ir)
221          {
222          if (j < ir && arrin[indx[j]] < arrin[indx[j + 1]]) j++;
223          if (q < arrin[indx[j]])
224       {
225       indx[i] = indx[j];
226          j += (i=j);
227          } /* end - if (q < arrin[indx[j]]) */
228          else j = ir + 1;
229          } /* end - while (j <= ir) */
230
231       indx[i] = indxt;
232
233       } /* end - for (;;) */
234
235     } /* end - void indexx( int n, int arrin[], int indx[]) */
236
237 /* ndapqnt0()        Analysis Software             ndapqnt0()
238 **
239 ** Programmer:    H. L. Kasdan
240 **
241 ** Copyright :    1988 by
242 **         International Remote Imaging Systems, Inc.
243 **
244 **********************************************************************
245 **
246 ** NAME
247 **       ndapqnt0 - order index array for log image data
248 **
249 ** SYNOPSIS
250 **       #include <stdio.h>
251 **       #include <string.h>
252 **       #include "cca.h"
253 **       #include "ndap.h"
254 **       void ndapqnt0( int n, int arrin[], int indx[], int quant[50])
255 **       int n;                          number of elements to be ordered
256 **       int arrin[];                    array containing elements to
```

```
257 **                                              be ordered
258 **           int indx[];                        array containing indecies of
259 **                                              elements in arrin that will
260 **                                              be ordered. This index array
261 **                                              will be ordered in place.
262 **           int quant[50];                     arrray in which 50 quantiles
263 **                                              will be returned
264 **
265 ** DESCRIPTION
266 **        Routine orders determines quantiles from elements in array
267 **        arrin according to index array, indx.
268 **
269 ** SEE ALSO
270 **
271 ** DIAGNOSTICS
272 **
273 ** BUGS
274 **
275 ** REVISION HISTORY
276 **
277 ***********************************************************************
278 */
279 void ndapqnt0( n, arrin, indx, quant)
280   int n;                        /* number of elements to be ordered */
281   int arrin[];                  /* array containing elements to
282                                    be ordered */
283   int indx[];                   /* array containing indecies of
284                                    elements in arrin that will
285                                    be ordered. This index array
286                                    will be ordered in place. */
287   int quant[50];                /* arrray in which 50 quantiles
288                                    will be returned */
289
290
291 {
292 /*
293 ***********************************************************************
294 **                          LOCAL STORAGE
295 ***********************************************************************
296 */
297   int i;
298   int j0 = 0;                   /* quantile index */
299   int jnext;                    /* target quantile index */
300 /*
301 **                        Generate Quantiles
302 */
303   quant[0] = arrin[indx[1]];
304   j0 = 1;
305   for (i = 1; (i <= n) && (j0 < 50); i++)
306     {
307     jnext = (i * 50) / n;
308     while (((jnext - j0) > 0) && (j0 < 50))
309       {
310       quant[j0++] = arrin[indx[i]];
311       } /* end - while ((jnext - j0++) > 1) */
312
313     } /* end - for (i = 1; i <= n; i++) */
314   } /* end - void ndapqnt0( int n, int arrin[], int indx[]) */
315
316
317 /* ndapmsd0()        Analysis Software            ndapmsd0()
318 **
319 ** Programmer:   H. L. Kasdan
320 **
321 ** Copyright :   1988 by
322 **        International Remote Imaging Systems, Inc.
323 **
324 ***********************************************************************
325 **
326 ** NAME
327 **       ndapmsd0 - order index array for log image data
328 **
329 ** SYNOPSIS
330 **           #include <math.h>
331 **           #include <stdio.h>
332 **           #include <string.h>
333 **           #include "cca.h"
334 **           #include "ndap.h"
335 **           void ndapmsd0( int n, int arrin[], int indx[], int *mean,
336                             int *sdev)
```

```
337 **            int n;                      number of elements to be ordered
338 **            int arrin[];                array containing elements to
339 **                                        be ordered
340 **            int indx[];                 array containing indecies of
341 **                                        elements in arrin that will
342 **                                        be used.
343 **            int *mean;                  mean value of specified
344 **                                        elements
345 **            int *sdev;                  standard deviation of
346 **                                        specified elements
347 **
348 ** DESCRIPTION
349 **       Routine orders computes mean and standard deviation of
350 **       elements in array arrin specified in index array, indx.
351 **
352 ** SEE ALSO
353 **
354 ** DIAGNOSTICS
355 **
356 ** BUGS
357 **
358 ** REVISION HISTORY
359 **
360 *****************************************************************
361 */
362 void ndapmsd0( n, arrin, indx, mean, sdev)
363    int n;                    /* number of elements to be ordered */
364    int arrin[];              /* array containing elements to
365                              be ordered */
366    int indx[];               /* array containing indecies of
367                              elements in arrin that will
368                              be ordered. This index array
369                              will be ordered in place. */
370    int *mean;                /* mean value of specified
371                              elements */
372    int *sdev;                /* standard deviation of
373                              specified elements */
374
375
376 {
377 /*
378 *****************************************************************
379 **                         LOCAL STORAGE
380 *****************************************************************
381 */
382   double dmean;                   /* running first moment */
383   double dpixel;                  /* temp pixel value */
384   double dsdev;                   /* double std dev */
385   double dsm;                     /* running second moment */
386   int i;
387 /*
388 **                         Compute Moments
389 */
390   dmean = 0.;
391   dsm   = 0.;
392   for (i = 1; i <= n; i++)
393   {
394     dpixel = (double)arrin[indx[i]];
395     dmean += dpixel;
396     dsm   += dpixel * dpixel;
397   } /* end - for (i = 1; i <= n; i++) */
398   dmean /= (double)n;
399   *mean = (int)dmean;
400   dsm /= (double)n;
401   dsdev = dsm - (dmean * dmean);
402   dsdev = (dsdev >= (double)0. ) ? dsdev : (double)0.;
403   dsdev = sqrt(dsdev);
404   *sdev = (int)dsdev;
405 } /* end - void ndapmsd0( int n, int arrin[], int indx[]) */
406
```

I claim:

1. A method of identifying an object under examination, said object has a discernible boundary; said method comprising the steps of:

a) forming an image of said object;

b) segmenting said image to form a plurality of pixels;

c) detecting the boundary of said object under examination in said image;

d) measuring a parameter, P, for each pixel inside the boundary detected, resulting in a plurality of values for the parameter P measured;

e) forming an ordered sequence, having a form $P_1 \ldots P_k \ldots P_N$ wherein $P_1$ represents a first value of the ordered sequence of measured parameter P; $P_N$ represents a last value of the ordered sequence of measured parameter P where N represents a total number of pixels inside the boundary detected; $P_k$ represents a kth value of the ordered sequence of measured parameter P having a value between $P_1$ and $P_N$, where k represents an index to the N pixels;

f) determining one or more values of k from a relationship of the form, $$\frac{i-1}{M} < \frac{k}{N} \leq \frac{i}{M}$$

where M represents a total number of quantile partitions for the measured parameter P; represents an $i^{th}$ fraction of partition or $i^{th}$ quantile partition for the measured parameter P;

g) determining the value of $P_k$ from the one or more values of k determined in step (f); and h) identifying said object under examination, based upon the value(s) of $P_k$ determined from step associated with said object.

2. The method of claim 1 wherein $P_1$ is the smallest value of $P_N$ is the largest value.

3. The method of claim 1, wherein said identifying step further comprising:
comparing the value(s) of $P_k$ determined from step (g) for said object under examination, to a table of pre-determined relationships of other identified objects to identify the object under examination.

4. The method of claim 3, wherein said table of pre-determined relationships of other identified objects comprises a range of values.

5. The method of claim 3, wherein said table of predetermined relationships of other identified objects comprises a single value.

6. The method of claim 4, wherein said table of pre-determined relationships are based upon experimental results.

7. The method of claim 6, wherein said table of predetermined relationships of other identified objects comprises a single value.

8. The method of claim 1, wherein said parameter is intensity of visible light.

9. The method of claim 1, wherein said parameter is a function of color representations at the same pixel location.

10. The method of claim 9, wherein said color representation is based upon three primary colors.

11. The method of claim 9, wherein said color representation is based upon hue, intensity, and saturation of colors.

12. The method of claim 10, wherein said parameter is $$log(a) - log(b)$$

wherein a and b are the intensities of two different colors.

13. The method of claim 12 wherein a is red color and b is blue color.

14. The method of claim 12, wherein a is blue color and b is green color.

15. The method of claim 12, wherein a is green color and b is red color.

16. A method of differentiating a plurality of different objects (object 1 and object 2) under examination, wherein each object has a discernible boundary; said method comprising the steps of:

a) forming a plurality of images, with an image of each of said plurality of objects;

b) segmenting each of said plurality of images to form a plurality of pixels;

c) detecting the boundary of each object under examination in each of said images;

d) measuring a parameter, P, for each pixel inside the boundary of each object detected, resulting in a plurality of values for the parameter P measured for each object;

e) forming an ordered sequence having a form $P_{11}$... $P_{k1}$... $P_{N1}$ for object 1, wherein $P_{11}$ represents a first value of the ordered sequence of measured parameter P for object 1; $P_{N1}$ represent a last value of the ordered sequence of measured parameter P for object 1 where N1 represents a total number of pixels inside the boundary of object 1 detected; $P_{k1}$ represents a kth value of the ordered sequence of measured parameter P having a value between $P_{11}$ and $P_{N1}$, wherein k represents an index to the N1 pixels; and an ordered sequence having a form $P_{12}$... $P_{k2}$... $P_{N2}$ for object 2, wherein $P_{12}$ represents a first value of the ordered sequence of measured parameter P for object 2; $P_{N2}$ represents a last value of the ordered sequence of measured parameter P for object 2 wherein N2 represents a total number of pixels inside the boundary of object 2 detected; $P_{k2}$ represents a kth value of the ordered sequence of measured parameter P having a value between $P_{12}$ and $P_{N2}$, where k represents an index to the N2 pixels;

f) determining, for each ordered sequence formed, one or more values of k from a relationship of the form $$\frac{i-1}{M} < \frac{k}{\text{Total No. of pixels for the object}} \leq \frac{i}{M}$$

wherein M represents a total number of quantile partitions for the measured parameter P; i represents $i^{th}$ fraction of partition or $i^{th}$ quantile partition for the measured parameter P;

g) determining the value(s) of $P_k$, for each object, from the one or more values of k determined in step (f) for identical values of i and M;

h) comparing the $P_k$ value(s) determined in step (g) for each object to one another to differentiate the objects.

17. The method of claim 16, wherein said parameter is intensity of visible light.

18. The method of claim 16, wherein said parameter is a function of color representations at the same pixel location.

19. The method of claim 18, wherein said color representation is based upon three primary colors.

20. The method of claim 18, wherein said color representation is based upon hue, intensity, and saturation of colors.

21. The method of claim 19, wherein said parameter is $$log(a) - log(b)$$

where a and b are the intensities of two different colors.

22. The method of claim 21 wherein a is red color and b is blue color.

23. The method of claim 21, wherein a is blue color and b is green color.

24. The method of claim 21, wherein a is green color and b is red color.

25. An apparatus for identifying an object under examination, said object has a discernible boundary; said apparatus comprising:
   a) means for forming an image of said object;
   b) means for segmenting said image to form a plurality of pixels;
   c) means for detecting the boundary of said image of said object under examination;
   d) means for measuring a parameter, P, for each pixel inside the boundary detected, resulting in a plurality of values for the parameter P measured;
   e) means for forming an ordered sequence having a form $P_1 \ldots P_k \ldots P_N$ wherein $P_1$ represents a first value of the ordered sequence of measured parameter P; $P_N$ represents a last value of the ordered sequence of measured parameter P where N represents a total number of pixels inside the boundary detected; $P_k$ represents a kth value of the ordered sequence of measured parameter P having a value between $P_1$ and $P_N$, wherein k represents an index to the N pixels;
   f) means for determining one or more values of k from a relationship of the form, $$\frac{i-1}{M} < \frac{k}{N} \leq \frac{i}{M}$$

where M represents a total number of quantile partitions for the measured parameter P; i represents an $i^{th}$ fraction of partition or $i^{th}$ quantile partition for the measured parameter P;
   g) means for determining the value(s) of $P_k$ from the one or more values of k determined in step (f); and
   h) means for identifying said object under examination, based upon the value(s) of $P_k$ determined from step (g) associated with said object.

26. The apparatus of claim 25 wherein $P_1$ is the smallest value and $P_N$ is the largest value.

27. The apparatus of claim 25, wherein said means for identifying further comprising:
   means for comparing the value(s) of $P_k$ determined from step (g) for said object under examination, to a table of pre-determined relationships of other identified objects to identify the object under examination.

28. The apparatus of claim 27, wherein said table of pre-determined relationships of other identified objects comprises a range of values.

29. The apparatus of claim 26, wherein said parameter is intensity of visible light.

30. The apparatus of claim 29, wherein said parameter is a difference of color representations at the same pixel location.

31. The apparatus of claim 30, wherein said color representation is based upon three primary colors.

32. The apparatus of claim 30, wherein said color representation is based upon hue, intensity, and saturation of colors.

33. The apparatus of claim 31, wherein said parameter is $$\log(a) - \log(b)$$

where a and b are the intensities of two different primary colors.

34. The apparatus of claim 33, wherein a is red color and b is blue color.

35. The apparatus of claim 33, wherein a is blue color and b is green color.

36. The apparatus of claim 33, wherein a is green color and b is red color.

37. An apparatus for differentiating a plurality of objects (object 1 and object 2) under examination, each of said objects has a discernible boundary; said apparatus comprising:
   a) means for forming an image of each of said plurality of objects to form a plurality of images;
   b) means for segmenting each of said plurality of images to form a plurality of pixels;
   c) means for detecting the boundary of each of said plurality of objects under examination in each of said plurality of images;
   d) means for measuring a parameter, P, for each pixel inside the boundary of each object detected, resulting in a plurality of values for the parameter P measured for each object;
   e) means for forming an ordered sequence having a form $P_{11} \ldots P_{k1} \ldots P_{N1}$ for object 1, wherein $P_{11}$ represents a first value of the ordered sequence of measured parameter P for object 1; $P_{N1}$ represents a last value of the ordered sequence of measured parameter P for object 1 wherein N1 represents a total number of pixels inside the boundary of object 1 detected; $P_{k1}$ represents a kth value of the ordered sequence of measured parameter P having a value between $P_{11}$ and $P_{N1}$, where k represents an index to the N1 pixels; and an ordered sequence having a form $P_{12} \ldots P_{k2} \ldots P_{N2}$ for object 2, wherein $P_{12}$ represents a first value of the ordered sequence of measured parameter P for object 2; $P_{N2}$ represents a last value of the ordered sequence of measured parameter P for object 2 wherein N2 represents a total number of pixels inside the boundary of object 2 detected; $P_{k2}$ represents a kth value of the ordered sequence of measured parameter P having a value between $P_{12}$ and $P_{N2}$, where k represents an index to the N2 pixels;
   f) means for determining, for each ordered sequence formed, one or more values of k from a relationship of the form $$\frac{i-1}{M} < \frac{k}{\text{Total No. of pixels for the object}} \leq \frac{i}{M}$$

where M represents a total number of quantile partitions for the measured parameter P; i represents $i^{th}$ fraction of partition or $i^{th}$ quantile partition for the measured parameter P;
   g) means for determining, for each object, the value(s) of $P_k$ from the one or more values of k determined in step (f) for identical values of i and M;
   h) means for comparing the $P_k$ value(s) determined in step (g) for each object to one another to differentiate the objects.

38. The apparatus of claim 37 wherein $P_1$ is the smallest value and $P_N$ is the largest value.

39. The apparatus of claim 37, wherein said means for identifying further comprising:
   means for comparing the value(s) of $P_k$ determined from step (g) for said objects under examination, to a table of pre-determined relationships of other identified objects to identify the objects under examination.

40. The apparatus of claim 39, wherein said table of pre-determined relationships of other identified objects comprises a range of values.

41. The apparatus of claim 38, wherein said parameter is intensity of visible light.

42. The apparatus of claim 41, wherein said parameter is a difference of color representations at the same pixel location.

43. The apparatus of claim 42, wherein said color representation is based upon three primary colors.

44. The apparatus of claim 42, wherein said color representation is based upon hue, intensity, and saturation of colors.

45. The apparatus of claim 43, wherein said parameter is $$log(a) - log(b)$$

where a and b are the intensities of two different primary colors.

46. The apparatus of claim 45, wherein a is red color and b is blue color.

47. The apparatus of claim 45, wherein a is blue color and b is green color.

48. The apparatus of claim 45, wherein a is green color and b is red color.

* * * * *